Figure 1:
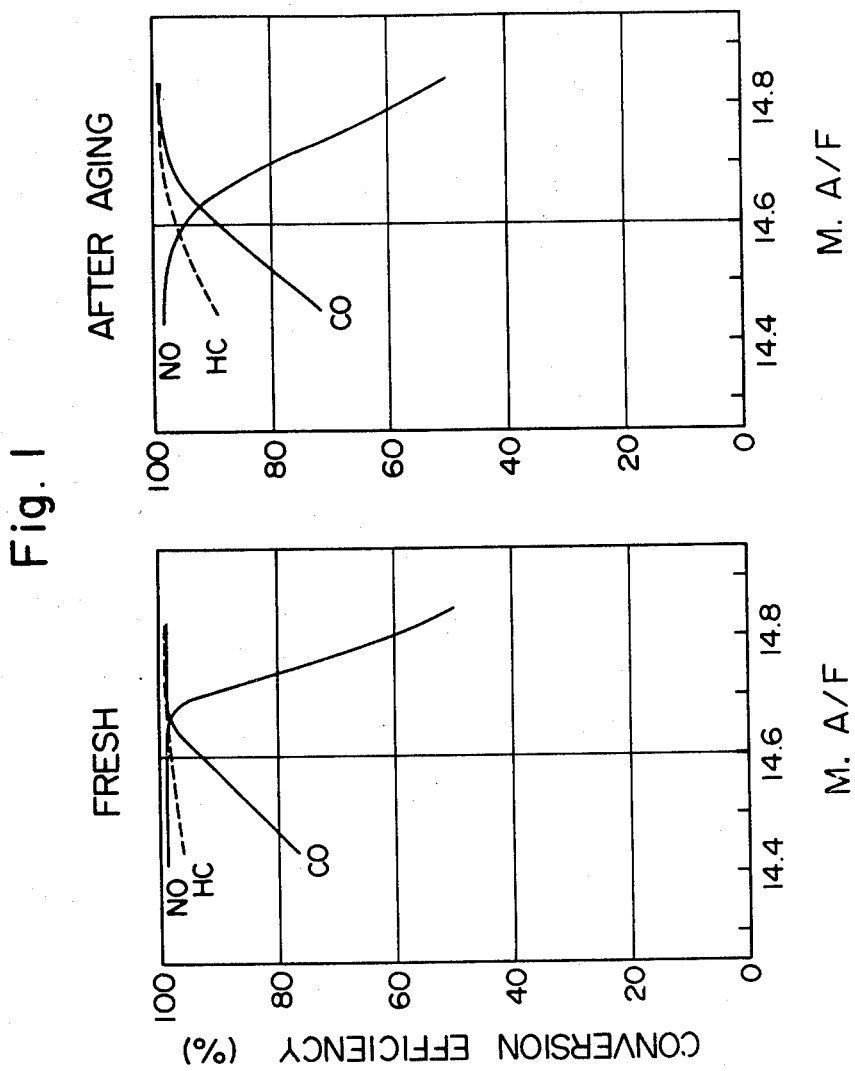
Figure 2:
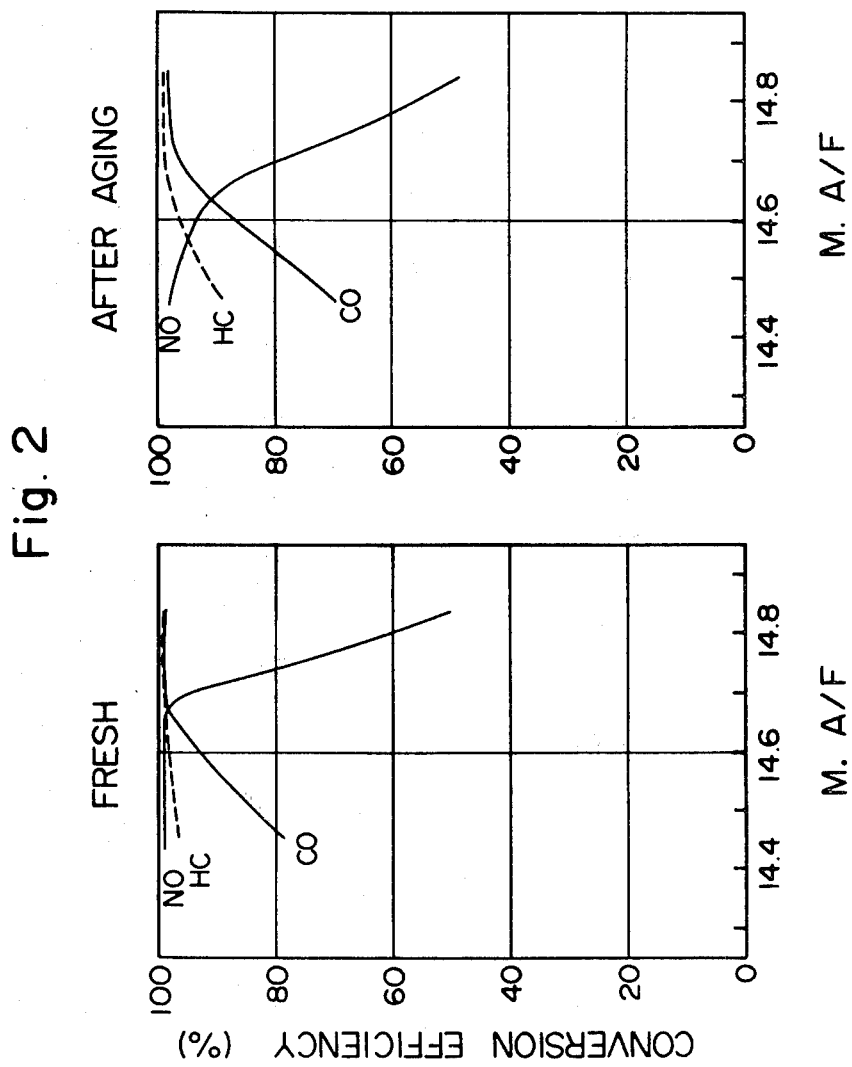
Figure 3:
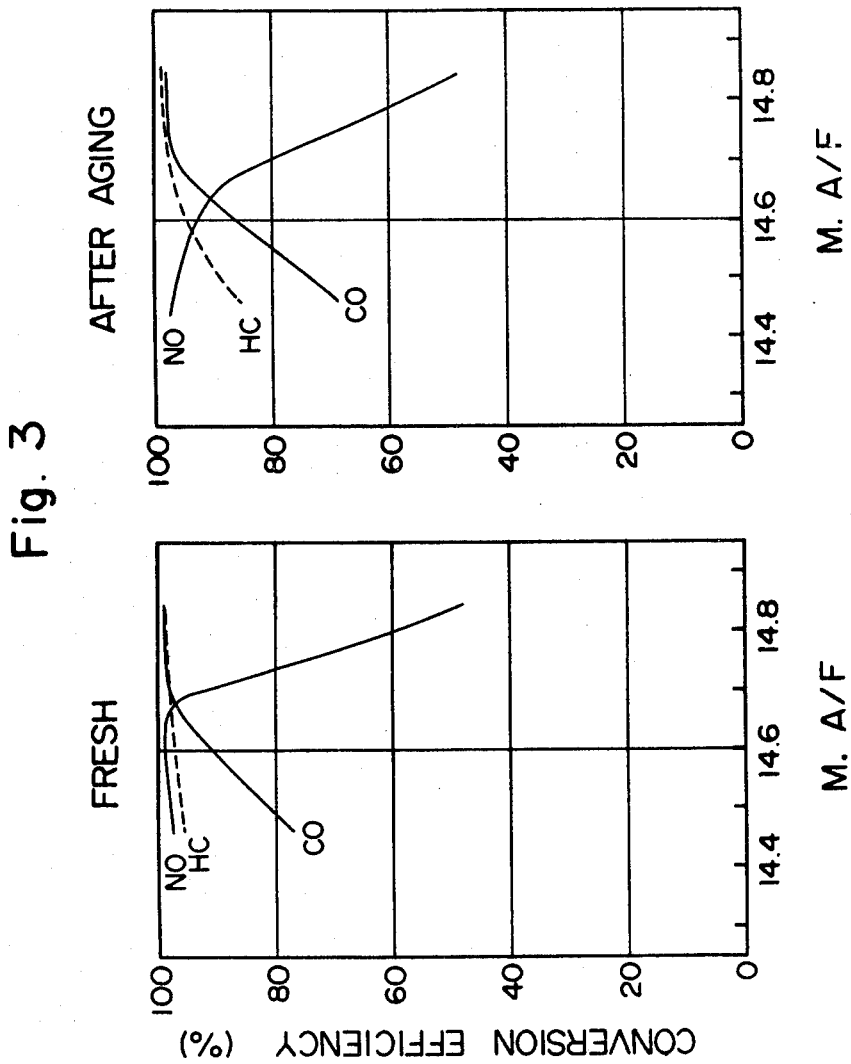
Figure 4:
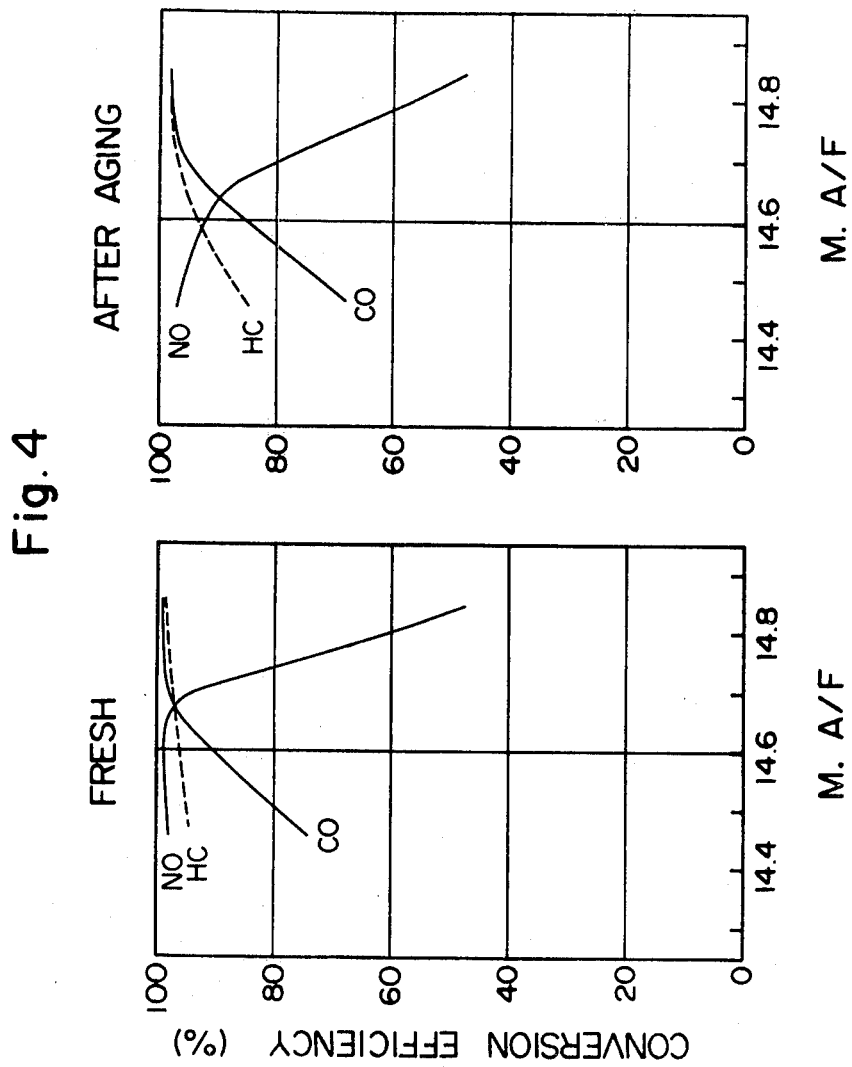
Figure 5:
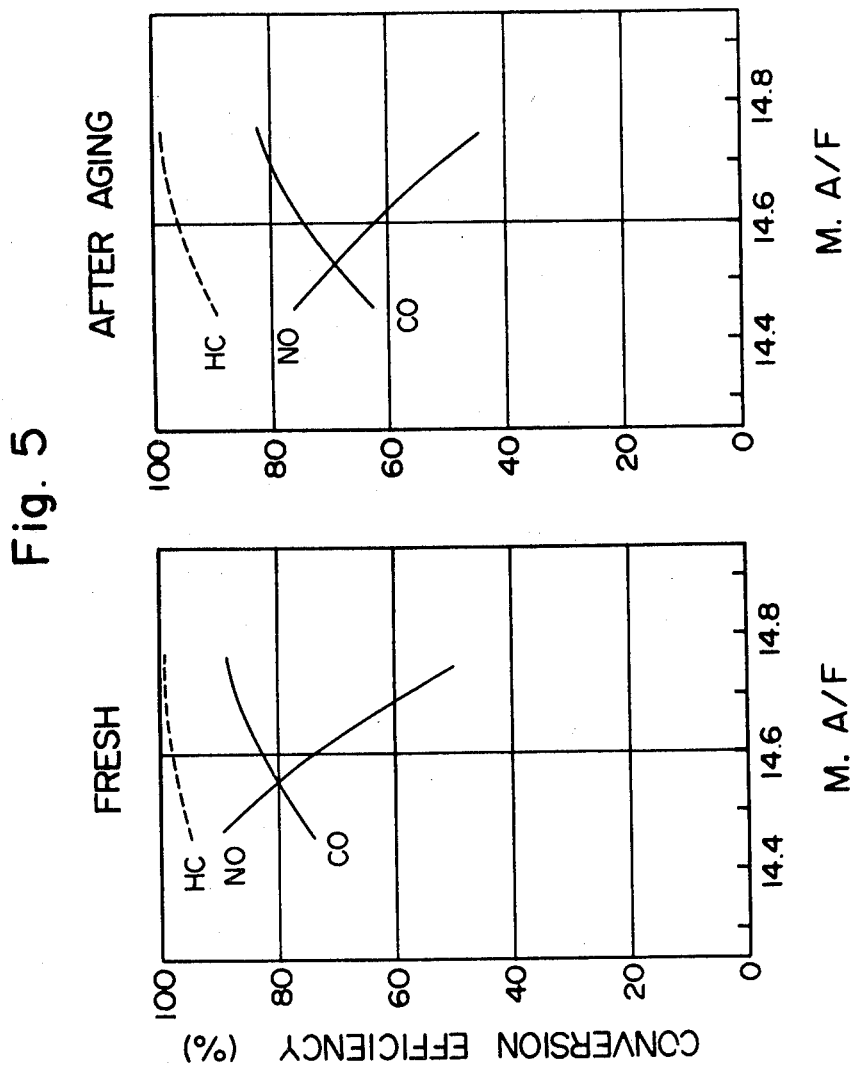
Figure 6:
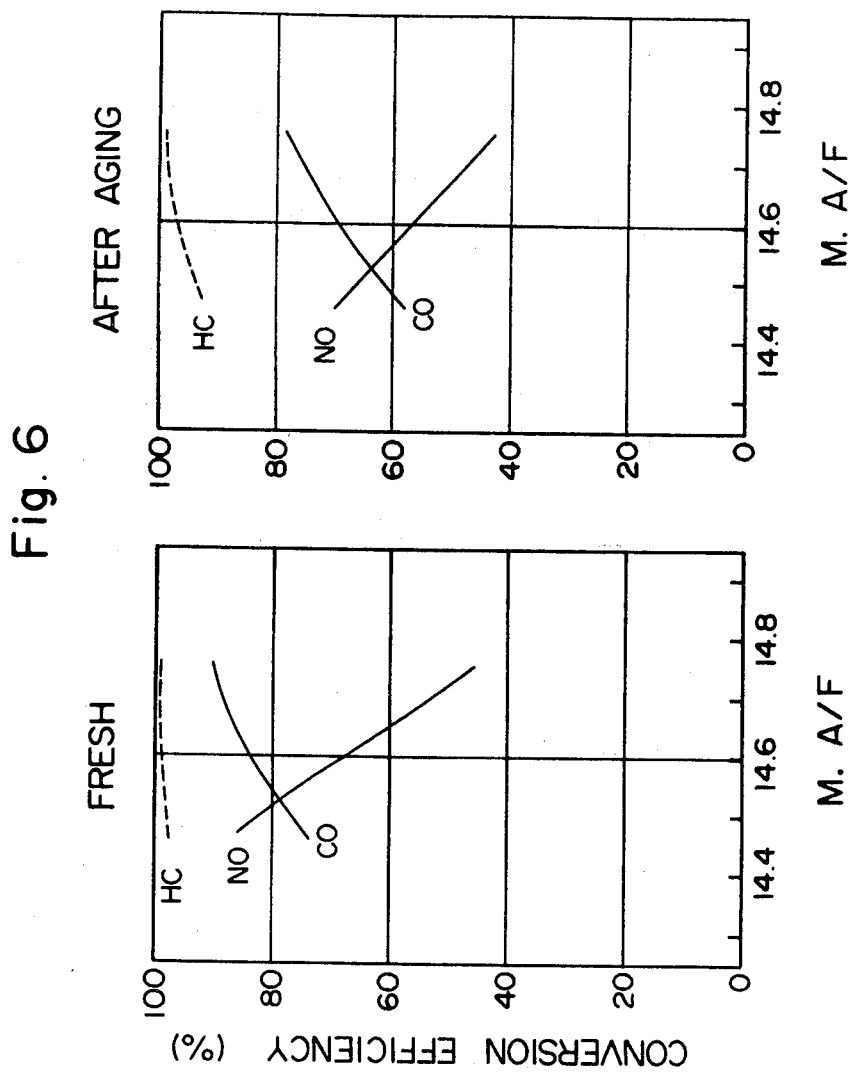
Figure 7:
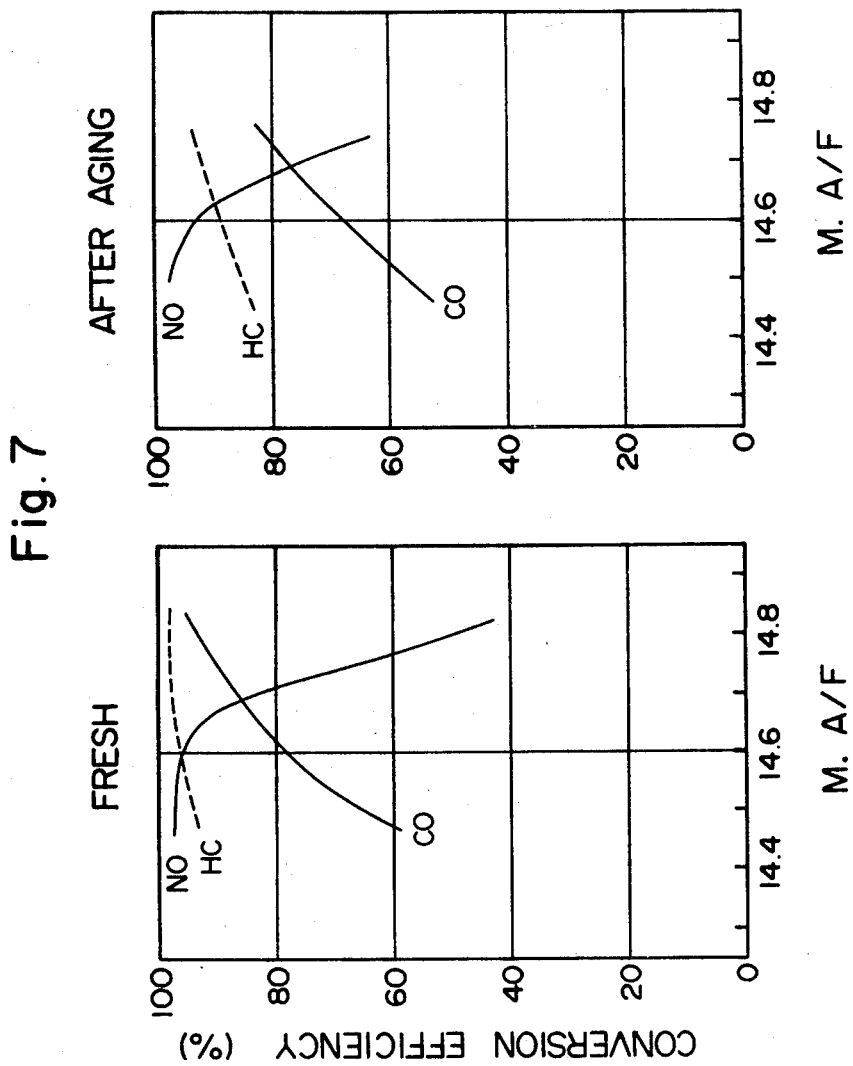
Figure 8:
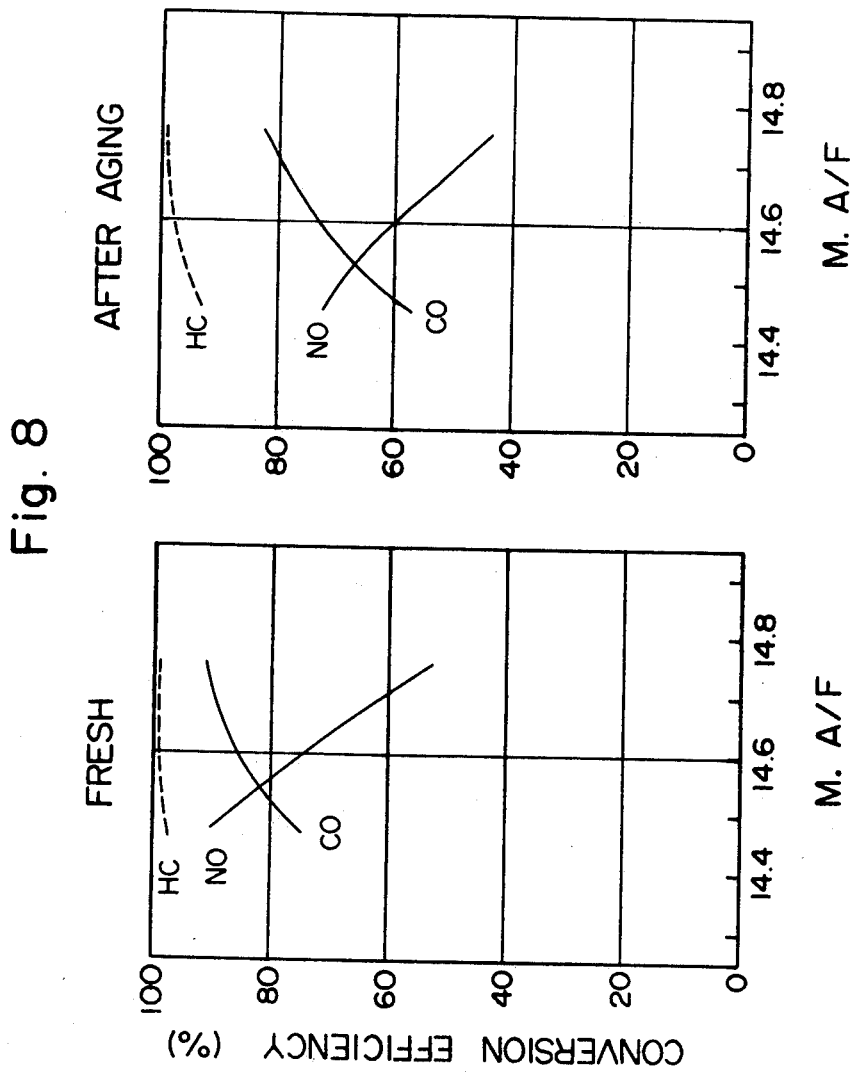

United States Patent [19]

Ohara et al.

[11] 4,283,308
[45] Aug. 11, 1981

[54] AUTO EXHAUST GAS CATALYST, AND PROCESS FOR PRODUCTION THEREOF

[75] Inventors: Takashi Ohara, Nishinomiya; Tetsuji Ono, Amagasaki; Kiyoshi Yonehara, Takatsuki; Shin Yamauchi, Ikeda, all of Japan

[73] Assignee: Nippon Shokubai Kagaku Kogyo Co., Ltd., Osaka, Japan

[21] Appl. No.: 91,401

[22] Filed: Nov. 6, 1979

Related U.S. Application Data

[63] Continuation-in-part of Ser. No. 43,484, May 29, 1979, abandoned.

[30] Foreign Application Priority Data

Jul. 12, 1978 [JP] Japan .................................. 53-84023
Aug. 8, 1978 [JP] Japan .................................. 53-95815

[51] Int. Cl.$^3$ ...................... B01J 27/14; B01J 23/10; B01J 8/08
[52] U.S. Cl. .................................... 252/435; 252/437; 252/462; 423/213.5
[58] Field of Search ...................... 252/435, 437, 462; 423/213.5

[56] References Cited

U.S. PATENT DOCUMENTS

| 3,953,369 | 4/1976 | Ohara et al. ............... 252/466 PT X |
| 3,965,040 | 6/1976 | Kobylinski et al. .................. 252/435 |
| 4,128,503 | 12/1978 | Yamauchi et al. .................... 252/435 |
| 4,140,655 | 2/1979 | Chobot et al. ........................ 252/462 |
| 4,148,822 | 4/1979 | Ogawa et al. .................. 252/437 X |
| 4,153,579 | 5/1979 | Summer et al. ...................... 252/462 |
| 4,170,573 | 10/1979 | Ernest et al. .......................... 252/462 |
| 4,189,405 | 2/1980 | Knapton et al. ...................... 252/462 |

Primary Examiner—Delbert E. Gantz
Assistant Examiner—William G. Wright
Attorney, Agent, or Firm—Sherman & Shalloway

[57] ABSTRACT

A process for producing an auto exhaust gas catalyst capable of simultaneously removing hydrocarbons, carbon monoxide and nitrogen oxides, which comprises depositing on a refractory inorganic support, 0.5 to 30 g of cerium, 0 to 20 g of iron, 0 to 10 g of lanthanum, 0.005 to 0.3 g of rhodium, 0.05 to 3.0 g of platinum, 0 to 1.2 g of palladium and 0 to 0.5 g of phosphorus as elements per liter of the finished catalyst in any desired sequence.

19 Claims, 13 Drawing Figures

AUTO EXHAUST GAS CATALYST, AND PROCESS FOR PRODUCTION THEREOF

This application is a continuation-in-part application of Ser. No. 043,484 filed on May 29, 1979 now abandoned.

This invention relates to an auto exhaust gas catalyst, and a process for production of such a catalyst. Specifically, this invention relates to a catalyst for removing hydrocarbons, carbon monoxide and nitrogen oxides from exhaust gases, and a process for producing such a catalyst. More specifically, this invention relates to an auto exhaust gas catalyst for simultaneously removing hydrocarbons, carbon monoxide and nitrogen oxides stably from exhaust gases of an internal combustion engine when it is operated at an air-fuel ratio near the stoichiometric point, and to a process for producing such an auto exhaust gas catalyst.

A so-called three-way conversion catalyst for use in removing hydrocarbons (HC), carbon monxoide (CO) and nitrogen oxides ($NO_x$) simultaneously from exhaust gases of an internal combustion engine by means of one catalyst converter has already been mounted on some of marketed motor vehicle engines. It is expected that an internal combustion engine equipped with this three-way catalyst will form an exhaust gas most effectively freed from the aforesaid three components when it is operated at an air-fuel ratio (A/F) near the stoichiometric point. However, in actually driving a motor vehicle in the urban and outskirt areas, the engine is operated in a non-steady mode including acceleration and deceleration. The incessant changes in the condition of the engine cause deviation from the set A/F, and therefore, a feedback mechanism (or a closed loop mechanism) is necessary in order to remove the deviation rapidly. Specifically, it is necessary to install an electronically controlled fuel injection system or a modified venturi carburetor and a control mechanism for correcting the A/F ratio by a signal from an oxygen sensor disposed within an exhaust pipe.

It is well known however that even when such an A/F feedback mechanism is provided, the response time of control inevitably leads to a periodic variation of the A/F ratio of the engine from the stoichiometric point with a considerable width. Larger widths of variations frequently result in reduced performance of the three-way catalyst. In other words, the range of A/F (called a window width) in which three components can be removed simultaneously at a high conversion (for example, more than 80%) is much narrower than when the composition of the gaseous mixture is constant, or there is even no window width.

In an attempt to cope with such a situation, it was suggested to broaden the operable range toward an excessive amount of air (A) in the A/F ratio by using a catalyst containing a metal having the high ability to temporarily absorb excessive oxygen in the gas (such as rhenium). The suggested method, however, has the defect that the added metal forms a volatile oxide or is liable to be poisoned with sulfur in the exhaust gas, or the window width is not as broad as is satisfactory in practical application.

An object of this invention is to provide a catalyst which has the capability to remove the three components effectively under periodically varying A/F ratios, and a process for producing such a catalyst.

Another object of this invention provides an improved catalyst comprising as active ingredients rhodium (Rh) and platinum (Pt), now the most evaluated three-way catalyst, which can retain high conversions for removing the three components without narrowing the window width by periodic variations in A/F in an actual driving mode; and also a process for producing such a catalyst.

Still another object of this invention is to provide a Rh-Pt catalyst which despite the minimized amount of expensive rhodium (Rh) whose resource is scarce, exhibits high conversions in removing the three components.

U.S. Pat. No. 4,128,503 discloses a three-way conversion catalyst for cleaning exhaust gases from an internal combustion engine, and a process for producing such a catalyst. The catalyst comprises 2 to 50 g of P, 2 to 50 g of Ba, 0 to 30 g of Ni, 0.05 to 3 g of Pt and/or Pd and 0.005 to 0.3 g of Rh as elements per liter of the finished catalyst, and is produced by depositing P, Ba and Ni on a carrier, then calcining the product, depositing Pt and/or Pd and Rh, and thereafter, subjecting the product to an activating treatment. However, an A/F perturbation test of this catalyst shows that the window width is not broad enough. This is probably because the oxide of P and the oxide of Ba cannot easily take various atomic valences and therefore tend to have the insufficient ability to absorb and store oxygen, and also because the distribution of deposition of Rh and Pt or Pd is not controlled optimally, and therefore, the performance of the catalyst is not constant owing to the influence of the ratio between Rh and Pt or Pd.

Accordingly, a further object of this invention is to provide a three-way conversion catalyst which is free from these defects.

The present inventors have made various extensive investigations, and found that the above objects of this invention can be achieved by depositing an element having the great ability to absorb and store oxygen, such as Ce, Fe or La, depositing a small amount of Rh predominantly on the surface of the catalyst, and preferably by supporting Pt or Pt and Pd in an amount about 10 times as much as Rh in a layer substantially deeper than the Rh-deposited layer.

Thus, according to this invention, the desired auto exhaust gas catalyst can be produced by depositing on a refractory inorganic carrier 0.5 to 30 g of cerium, 0 to 20 g of iron, 0 to 10 g of lanthanum, 0.005 to 0.3 g of rhodium, 0.05 to 3.0 g of platinum, 0 to 1.2 g of palladium and 0 to 0.5 g of phosphorus, as elements per liter of the finished catalyst, in any desired sequence.

According to a modification of the above process of the invention, a preferred type of auto exhaust gas catalyst in accordance with this invention which comprises a refractory inorganic carrier and deposited thereon 0.5 to 30 g of cerium, 0 to 20 g of iron, 0 to 10 g of lanthanum, 0.005 to 0.3 g of rhodium, 0.05 to 3.0 g of platinum, 0 to 1.2 g of palladium and 0 to 0.5 g of phosphorus as elements per liter of the finished catalyst can be produced by first depositing cerium, iron, lanthanum, platinum, palladium and phosphorus on the inorganic carrier, and then depositing rhodium thereon.

In the catalyst of this invention, especially in the aforesaid preferred type of catalyst, Rh is deposited on the surface layer, and Pt or Pt and Pd are supported in a layer substantially deeper than the Rh-deposited layer. Hence, the catalyst can exhibit sufficient effects even when the amount of Rh is less than 20% by weight, particularly 10% or less, based on the amount of Pt.

The role of each of the elements which constitute the catalyst of this invention has not yet been fully elucidated. The present inventors, however, have found the following facts.

Ce, Fe and La have the ability to absorb and store oxygen in reacting gases, exhibit the action of minimizing the effect of variations in A/F. In addition, they facilitate a water gas shift reaction and a steam reforming reaction. In particular, Ce shows a marked effect in increasing the thermal stability of Rh and Pt which are to be deposited later. Furthermore, the oxides of these deposited Ce, Fe and La exhibit the action of favorably controlling the deposition profile of noble metals deposited in the subsequent step, and particularly serve to deposit a small amount of Rh on the surface portion of the catalyst as effectively as possible. Rh exists in an amount of about 1/19 of that of Pt as the mine ratio, and therefore, in practical applications, Rh can be used only in an amount of as small as 1/10 to 1/20 of the amount of Pt. In order to make such a small amount of rhodium to contribute effectively to the reaction, it is important to deposit Rh as predominantly as possible on the surface layer portion of the catalyst. The first-step Ce depositing treatment in this invention is effective to bring about this result.

Pt or Pt and Pd are preferably deposited from an aqueous solution of water-soluble compounds of these metals and phosphoric acid ($H_3PO_4$). At this time, phosphoric acid acts to control the depth of deposition of Pt or Pt and Pd. Since phosphoric acid occupies adsorption sites on the surface layer portion of the carrier by its extremely strong adsorbability to alumina, it is possible to deposit Pt or both Pt and Pd as a portion deep in the carrier. Thus, the layer Pt or both Pt and Pd deposited can be positioned deeper than the Rh-deposited layer, and the catalyst effect of Rh can be enhanced to the great extent. Since the degree of penetration of Pt or both Pt and Pd becomes deeper proportionally to the amount of phosphoric acid added, its amount should be selected in consideration of the amount of Rh deposited. Usually, the preferred amount of phosphoric acid is about 0.01 to 2 moles per mole of Pt or both Pt and Pd. Phosphoric acid having the property of being deposited on the surface layer portion of the carrier, when subsequently heat-treated, is not volatilized even, but remains in the catalyst (its chemical structure is not clearly known). The remaining phosphorus compound serves to inhibit the formation of by-product ammonia in the reducing reaction of NO in the exhaust gas, and facilitate complete reduction of NO to nitrogen.

The atomic valences of the individual elements in the finished catalyst of this invention and the forms of compounds in which these elements exist are not clearly known. It seems at least certain that the catalyst finally calcined in a reducing atmosphere is made up of noble metals (i.e., Pt, Pd, Rh metals) which are mostly in metallic form and oxides partly containing oxides of low atomic valences (e.g., $Fe_3O_4$). It has been found that since cerium is liable to form a sesquioxide, it is difficult to ascertain its exact atomic valence.

The basic elements constituting the catalyst may be replaced by other elements so long as such replacement does not cause a substantial change. For example, it is possible to replace Ce partly by praseodymium (Pr), neodymium (Nd) or gadolinium (Gd), or replace Fe partly by nickel (Ni), cobalt (Co), chromium (Cr), calcium (Ca) or barium (Ba).

Conventional pelletized porous carriers can be used as refractory inorganic carrier in this invention. A carrier composed of alumina is preferred, but other refractory inorganic carriers composed of a major proportion of alumina and a minor proportion of a heat-resistant material such as silica-alumina, silica, magnesia, zirconia or titania can also be used. The configuration of the pellets may be spherical, cylindrical, irregularly shaped, quadri lobe or trilobe shaped. An alumina carrier molded from a batch containing Fe or Ce components can also be used. Suitable carriers have a surface area of not more than 200 $m^2/g$, especially 30 to 150 $m^2/g$, a pore volume (measured by a mercury penetration method) of at least 0.4 cc/g, especially 0.5 to 1.3 cc/g, and an average pore diameter of at least 100 A, especially at least 150 A.

The catalyst produced by the method of this invention using the aforesaid pelletized porous carrier as the refractory inorganic carrier preferably has deposited therein 1 to 15 g of cerium, 0 to 15 g of iron, 0 to 10 g of lanthanum, 0.01 to 0.2 g of rhodium, 0.1 to 2.0 g of platinum, 0 to 0.8 g of palladium, and 0 to 0.5 g of phosphorus as elements per liter of the finished catalyst.

A monolithic refractory carrier having an active alumina coating formed thereon can also be used as the refractory inorganic carrier used in this invention. The monolithic refractory carrier is also called a honeycomb carrier preferably composed of a material having codierite ($2Al_2O_3$, $2MgO$, $5SiO_2$) as a main ingredient. It may also be made of mullite, $\alpha$-alumina and other materials having sufficiently high softening temperatures and mechanical strength. The monolithic refractory carrier is produced by extrusion, or by rolling and solidifying a sheet-like element. The configuration of its gas-passing openings (the cell configuration) may be hexagonal, tetragonal, triangular or corrugated. Preferably, it has a cell density (the number of cells per unit cross-sectional area) of 200 to 800/$in^2$. Methods for applying an active alumina coating to the monolithic refractory support are well known. For example, they include a method which comprises adhering a coating of alumina hydrate to the carrier and firing the carrier to convert the coating into an active alumina coating; a method which comprises adhering a coating of a fine powder of active alumina to the carrier, and then firing the carrier to fix the coating; and a method which comprises dipping the carrier in an aqueous solution of an aluminum salt and firing the carrier, and repeating this operation to form an adequate amount of alumina coating (the last one is rather troublesome).

A catalyst produced in accordance with the process of this invention using the aforesaid monolithic refractory carrier having an active alumina coating as the refractory inorganic carrier preferably has 0.5 to 30 g of cerium, 0 to 20 g of iron, 0 to 10 g of lanthanum, 0.02 to 0.3 g of rhodium, 0.2 to 3.0 g of platinum, 0 to 0.8 g of palladium and 0.01 to 0.5 g of phosphorus as elements per liter of the finished catalyst.

Materials for the production of the catalyst in this invention are selected from compounds capable of being activated to oxides or atoms by the activating treatment to be described hereinbelow. Usually, they are inorganic salts, organic salts, metal acids, and metal acid salts. Especially preferred starting materials are ferric nitrate and ammonium ferrous sulfate; cerous nitrate and ammonium ceric nitrate; phosphoric acid and ammonium phosphate; and the chlorides, nitrates, chloro-metallic acids and various complex salts of Rh, Pt and Pd (e.g., a water-soluble nitric acid-acidified compound of a dinitrodiammine complex salt; see U.S. Pat. No. 3,953,369).

The pellet-type catalyst of this invention having catalyst ingredients deposited on a pelletized carrier can be prepared, for example, by the following method (I) or (II).

Method (I)

Predetermined amounts of Ce, Fe and La (usually as the salts described hereinabove) are dissolved in water to form aqueous solutions. The carrier is contacted with the individual aqueous solutions or a mixture thereof, and by evaporating to dryness, predetermined amounts of Ce, Fe and La are deposited on the carrier. Or the carrier is dipped in an aqueous solution having the aforesaid compounds dissolved therein, withdrawn, and then dried to deposit predetermined amounts of Ce, Fe and La on the carrier. The carrier having these starting compounds deposited thereon is dried at 80° to 150° C. for 1 to 10 hours, and calcined in the air at 300° to 1100° C. for 1 to 10 hours to form a carrier having deposited thereon Ce, Fe and La oxides. Then, Rh is deposited on the resulting carrier. Specifically, the supported carrier is impregnated with an aqueous solution containing Rh (obtained by dissolving the aforesaid compound in water), and Rh is deposited on the carrier in a predetermined amount by the same procedure as above. To fix Rh onto the carrier, the carrier may be dried at 80° to 200°, preferably at 120° to 200° C., for 1 to 5 hours, or it may further be subjected to activation treatment. The activation treatment may be effected by various means such as oxidative calcination comprising calcination in the air at 150° to 600° C., preferably 300° to 500° C., for 1 to 10 hours; reductive calcination comprising reduction in a hydrogen atmosphere (obtained by diluting hydrogen with an inert gas such as nitrogen gas) at 150° to 600° C., preferably 250° to 500° C. for 1 to 10 hours; and wet reduction (usually performed for 10 minutes to 5 hours) comprising reduction in the liquid phase in the presence of a reducing agent as formaldehyde or hydrazine. Finally, the Rh-deposited carrier is dipped in an aqueous solution containing Pt, Pd and P to deposit predetermined amounts of Pt, Pd and P in the same way as above, and then dried in the same way as above. It may be further subjected to activation treatment to form a finished catalyst.

Method (II)

First, in the same way as in Method (I), Ce, Fe, La, Pt, Pd and P are deposited on the carrier in the same way as in Method (I), and then Rh is deposited on the resulting carrier in the same way as in Method (I) to form a finished catalyst. In Method (II), a relatively large amount of Ce and Fe ions compared with Pt in the impregnation solution has been found to greatly change the platinum deposition profile on the carrier. If a conventional platinum salt such as chloroplatinic acid is used in Method II), platinum penetrates too deep into the inside of the carrier, very often to the center of each pellet. However, a nitric acid solution containing a Ptdinitrodiammine complex, which has a surprisingly strong adsorbing power on alumina as shown in U.S. Pat. No. 3,953,369 can reduce the interference effect of Ce and Fe. Consequently, the Pt penetration depth can be controlled favourably by phosphoric acid.

Generally, the preferred amount of phosphoric acid in Method II) is smaller than the one in Method I).

As a new concept for catalytic automotive exhaust gas control, the so-called Modified Dual Bed system has been proposed. This system consists of a front three-way catalyst (reduced volume) bed and a rear oxidation bed with a closed loop control device and an air pump for the rear bed. In this situation, Rh is used only in the front three-way catalyst but substantial amounts of Pt and Pd are transferred to the rear oxidation catalyst. Therefore, even when the Pt to Rh ratio is maintained at a high ratio of, say, 10 to 1 in the total system, the front three-way catalyst has a much lower Pt to Rh ratio. When the front three-way catalyst having a Pt to Rh ratio of, for example, about 3 to 1 or about 1 to 1 is prepared by Method II), the optimum amount of phosphiric acid becomes extremely small, some-times decreases to nearly zero.

Use of a nonionic surface-active agent of the polyoxyethylene type is very effective in depositing Ce, Fe, La, Rh, Pt, Pd and P components in the preparation of the pellet-type catalyst described above. Moderate bubbling occurs as a result of using the polyoxyethylene-type nonionic surfactant, and contact among the aqueous solutions of the catalyst materials, carrier particles and the wall of the vessel becomes smooth. Thus, the result of deposition is uniform and reproducible. Furthermore, since the surface-active agent has low penetrability, Rh is dispersed effectively on the surface and the surface layer of the catalyst, and thus, with a minimum amount of Rh, a catalyst having the desired level of performance can be obtained. These advantages are exhibited especially when the catalyst is prepared in large quantities.

Examples of the surface-active agent used in this invention are as follows:

Polyethylene glycol $HO(C_2H_4O)_nH$ ($n=11-900$); polyoxyethylene glycol alkyl ethers $RO(C_2H_4O)_n$ in which R represents an alkyl group having 6 to 30 carbon atoms, and n is 3 to 30; "Pluronic"-type nonionic surfactants, i.e. polyoxyethylene-polyoxypropylene-polyoxyethylene glycol $HO(C_2H_4O)_a(C_3H_6O)_b(C_2H_4O)_cH$ in which a, b and c are each at least 1, and $a+b+c=20-400$; "Tetronic"-type nitrogen-containing nonionic surface-active agent expressed by the general formula

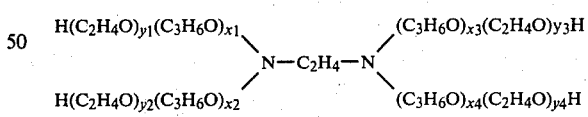

in which $x_1$ through $x_4$ are each at least 1, $y_1$ through $y_4$ are each at least 1, and $x_1+x_2+x_3+x_4+y_1+y_2+y_3+y_4=20-800$; polyoxyethylene alkylaryl ethers such as

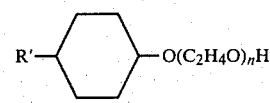

in which R′ represents an alkyl group having 6 to 12 carbon atoms, and n is 3 to 30; polyoxyethylene alkyl esters $R-COO(C_2H_4O)_nH$ or $R-COO(C_2H_4O)_{n-1}-CH_2CH_2COO-R$ in which R represents an alkyl group containing 6 to 24 carbon atoms, and n is 3 to 30; polyoxyethylene

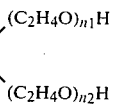

in which R represents an alkyl group having 6 to 30 carbon atoms, and n, $n_1$ and $n_2$ are 3 to 30; polyoxyethylene alkylamides

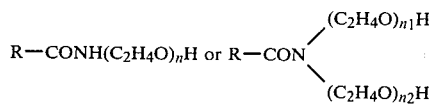

wherein R represents an alkyl group having 6 to 30 carbon atoms, and n, $n_1$ and $n_2$ are 3 to 30; and fatty acid esters of polyoxyethylene sorbitan of the formula

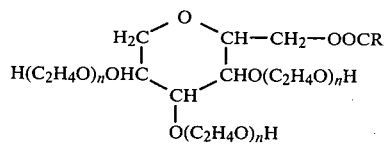

wherein R represents an alkyl group containing 6 to 24 carbon atoms, and n is 3 to 30.

Preferred nonionic surfactants among these have an average molecular weight of at least 500, especially at least 1,000. Nonionic surfactants having an average molecular weight of less than 500 have high penetrability. Therefore, the catalyst ingredients (particularly, noble metal ingredients) are uniformly distributed even in the interior of the carrier, and the amounts of these ingredients to be deposited must be increased. The amount of the surface-active agent is 0.05 to 50 g, preferably 0.1 to 20 g, per liter of the carrier, and it is used in a concentration of 0.005 to 10% by weight, preferably 0.01 to 5% by weight, in an aqueous solution of the catalyst materials.

The monolithic-type catalyst of this invention having the catalyst ingredients deposited on a monolithic refractory carrier is produced preferably by forming an active alumina coating on the monolithic refractory carrier in a known manner, and then depositing the catalyst ingredients on it in accordance with method I) described hereinabove. For example, the catalyst ingredients can be deposited by the method I) on an alumina coated layer formed by the method disclosed in U.S. Pat. No. 3,928,239. Alternatively, the formation of an active alumina coated layer and the deposition of Ce, Fe and La are performed at the same time by mixing a solution of amorphous alumina sol in an inorganic acid, as disclosed in U.S. Pat. No. 3,928,239, with rho-alumina powder and cerium nitrate, ferric nitrate and lanthanum nitrate, and then, Rh is deposited in accordance with the method I), followed finally by depositing Pt, Pd and P. Generally, the amount of the active alumina coating applied is 50 to 150 g per liter of the monolithic refractory carrier.

The present invention is illustrated specifically below by Examples and Comparative Examples and with reference to the accompanying drawings in which:

FIGS. 1 to 4, 9 and 10 are graphs showing the conversion efficiencies of the catalysts of Examples 1 to 4, 19 and 23 (both fresh catalysts and aged catalysts); and FIGS. 5 to 8 and 11 to 13 are graphs showing the conversion efficiencies of the catalysts of Comparative Examples 1 to 4 and 5 to 7 (both fresh and aged catalysts).

The three-way conversion catalysts were evaluated by a testing procedure summarized below.

In order to simulate a periodic deviation of the A/F ratio from stoichiometry in a "closed loop operation" with an oxygen sensor, a "function generator" is installed in NISSAN-L-18E engine (1.8 l displacement) with an electronic fuel injection system. The A/F perturbation technique used is very similar to the one described in SAE 770371.

An external periodic signal of sinusoidal shape at a frequency of 1.0 Hz from the function generator is introduced into an electronic control unit (ECU). Then, the DC voltage related to an A/F change of ±1.0 A/F unit (for example, from 13.5 to 15.5) is empirically determined. The engine is loaded by an electric dynamometer to simulate a typical cruising load.

Catalyst samples are charged into a stainless steel multi-cell reactor. The conversion efficiencies of the catalysts for HC, CO and NO are determined by analyzing the concentrations of gases from inlet and outlet sampling tubes, respectively.

In order to minimize the periodic changes of the gas concentrations, a small glass reservoir is provided before the analyzers. The analyzers used are the NDIR type for CO, $CO_2$ and NO; the FID type for HC; and the fuel cell type for $O_2$.

The mean A/F ratio of the inlet gas is calculated by the procedure described in SAE 680114:Eltinge.

After evaluating the fresh activity of each catalyst, the speed of the engine is increased to provide severer aging conditions, and the engine is operated with a slow perturbation of ±A/F at 0.1 Hz.

After 100 hours' aging, these catalysts are evaluated again by a similar testing procedure to the one used for fresh activity measurements.

EXAMPLE 1

Cerous nitrate [$Ce(NO_3)_3.6H_2O$], 1.55 g, and 3.6 g of ferric nitrate [$Fe(NO_3)_3.9H_2O$] were dissolved in 55 cc of water, and 0.05 g of a Pluronic-type nonionic surface-active agent (a blocked copolymer having an average molecular weight of 11,000 and derived from 20% by weight of propylene oxide and 80% by weight of ethylene oxide) was added dropwise. To the solution was added 100 cc of a commercially available spherical active alumina carrier (BET surface area 85 $m^2/g$; average particle diameter 3 mm), and they were mixed fully. The mixture was concentrated and evaporated to dryness over a warm water bath, dried at 150° C. for 2 hours, and calcined in the air at 550° C. for 3 hours.

The resulting carrier having Ce and Fe deposited thereon was then impregnated with 55 cc of an aqueous solution containing 0.013 g of rhodium chloride ($RhCl_3.3H_2O$) and 0.05 g of the same surface-active agent as described above. The applied solution was concentrated and evaporated to dryness, and the carrier was dried at 150° C. for 2 hours and calcined in the air at 500° C. for 3 hours. The product was then impregnated with 55 cc of an HCl acidified aqueous solution containing 0.133 g of chloroplatinic acid ($H_2PtCl_6.6H_2O$), 0.033 g of palladium chloride ($PdCl_2$), 0.019 g of 85% phosphoric acid and 0.05 g of the same surface-active agent as described above. The applied solution was then concentrated and evaporated to dryness. The carrier was dried in the same way as above, and to activate it, was calcined at 300° C. for 3 hours in a nitrogen gas stream containing 10% of hydrogen.

The ratio (atomic weight ratio) of the catalyst ingredients, and the amounts of these ingredients deposited in the finished catalyst (the atomic weight in grams per liter of the carrier) were as follows:

Fe:Ce:P:Pt:Pd:Rh = 5:5:0.05:0.5:0.2:0.05.

EXAMPLE 2

100 cc of the same carrier as used in Example 1 was impregnated with 55 cc of an acidic aqueous solution containing 3.62 g of ferric nitrate [$Fe(NO_3)_3.9H_2O$], 1.55 g of cerous nitrate [$Ce(NO_3)_3.6H_2O$], 0.082 g of dinitrodiamine platinum [$Pt(NH_3)_2(NO_2)_2$], 0.033 g of palladium chloride ($PdCl_2$), 0.019 g of 85% phosphoric acid and 0.025 g of the same Pluronic-type nonionic surface active agent as used in Example 1. The applied solution was concentrated and evaporated to dryness. The carrier was dried at 180° C. for 2 hours, and then calcined in the air at 550° C. for 3 hours.

The product was then impregnated with 55 cc of an aqueous solution containing 0.013 g of rhodium chloride ($RhCl_3.3H_2O$) and 0.05 g of the same surface-active agent as above. The applied solution was concentrated and evaporated to dryness, and dried at 150° C. for 2 hours. To activate the product, it was calcined at 300° C. for 3 hours in a nitrogen gas stream containing 10% of hydrogen. The finished catalyst had the same composition as the catalyst obtained in Example 1.

EXAMPLE 3

A finished catalyst having the same composition as the catalyst of Example 1 was prepared by operating in the same manner as in Example 1 except that after depositing the Rh component, the product was dried at 180° C. for 3 hours instead of drying 150° C. and calcination at 500° C. for 3 hours.

EXAMPLE 4

A finished catalyst having the same composition as the catalyst of Example 1 was prepared in the same way as in Example 1 except that in the activation treatment, the product was calcined in the air at 450° C. for 3 hours instead of calcining at 300° C. for 3 hours in a nitrogen gas stream containing 10% of hydrogen.

EXAMPLE 5

A finished catalyst having the same composition as the catalyst of Example 1 was obtained by operating in the same way as in Example 1 except that a commercially available cylindrical alumina carrier (surface area 105 m$^2$/g, average particle diameter 3 mm, average length 5 mm) was used instead of the commercially available spherical active alumina carrier, and 57 cc of the aqueous solutions containing the respective ingredients was used instead of 55 cc thereof.

EXAMPLE 6

A finished catalyst having the same composition as the catalyst obtained in Example 1 was prepared by operating in the same way as in Example 1 except that 3.51 g of ferrous ammonium sulfate [$FeSO_4(NH_4)_2SO_4.6H_2O$] was used instead of the ferric nitrate.

EXAMPLE 7

A finished catalyst having the same composition as the catalyst obtained in Example 1 was prepared by operating in the same way as in Example 1 except that 1.96 g of ceric ammonium nitrate [$Ce(NO_3)_4.2NH_4NO_3$] was used instead of the cerous nitrate.

EXAMPLE 8

A finished catalyst having the following composition was prepared by operating in the same way as in Example 1 except that the amount of the ferric nitrate was changed to 1.45 g, and the amount of the cerous nitrate was changed to 0.62 g.

Fe:Ce:P:Pt:Pd:Rh = 2:2:0.05:0.5:0.2:0.05

EXAMPLE 9

A finished catalyst having the following composition was obtained by operating in the same way as in Example 1 except that the amount of the ferric nitrate was changed to 7.23 g, and the amount of the cerous nitrate was changed to 3.1 g.

Fe:Ce:P:Pt:Pd:Rh = 10:10:0.05:0.5:0.2:0.05

EXAMPLE 10

A finished catalyst having the following composition was prepared by operating in the same way as in Example 2 except that the amount of the 85% phosphoric acid was changed to 0.008 g.

Fe:Ce:P:Pt:Pd:Rh = 5:5:0.02:0.5:0.2:0.05

EXAMPLE 11

A finished catalyst of the following composition was obtained by operating in the same way as in Example 1 except that 0.082 g of dinitrodiaminoplatinum as a nitric acid-acidified solution was used instead of the chloroplatinic acid, and the amount of the 85% phosphoric acid was changed to 0.114 g.

Fe:Ce:P:Pt:Pd:Rh = 5:5:0.3:0.5:0.2:0.05

EXAMPLE 12

A finished catalyst of the following composition was prepared by operating in the same way as in Example 1 except that 0.032 g of rhodium nitrate was used instead of the rhodium chloride. Fe:Ce:P:Pt:Pd:Rh = 5:5:0.05:0.5:0.2:0.1

EXAMPLE 13

A finished catalyst having the following composition was prepared by operating in the same way as in Example 2 except that the amount of the dinitrodiaminoplatinum was changed to 0.246 g, and the amount of the palladium chloride was changed to 0.099 g.

Fe:Ce:P:Pt:Pd:Rh = 5:5:0.05:1.5:0.6:0.05

EXAMPLE 14

A finished catalyst of the following composition was prepared by the same method as in Example 1 except that the amounts of the noble metal components deposited were varied.

Fe:Ce:P:Pt:Pd:Rh = 5:5:0.05:0.5:0:0.05

EXAMPLE 15

A catalyst having the same composition as in Example 1 was prepared in the same way as in Example 1 except that 0.1 g of a nonionic surface-active agent (Emasol 1130, a trademark for a product of Kao-Atlas Co., Ltd.; polyoxyethylene sorbitan monolaurate having an average molecular weight of 1,100 with 17 moles of ethylene oxide added in the entire molecules) was used instead of the Pluronic-type nonionic surfactant.

EXAMPLE 16

A catalyst having the same composition as the catalyst of this invention was prepared by operating in the same way as in Example 1 except that 0.1 g of a tetronic-type nonionic surfactant (a block copolymer with an average molecular weight of 9,000 derived from 30% by weight of PO and 70% by weight of EO) was used instead of the Pluronic-type surfactant.

EXAMPLE 17

A finished catalyst having the following composition was prepared by operating in the same way as in Example 2 except that the ferric nitrate was not added, and the amount of the rhodium chloride was changed to 0.026 g.

Ce:P:Pt:Pd:Rh = 5:0.05:0.5:0.2:0.1

COMPARATIVE EXAMPLES 1 TO 4

Catalysts having the compositions outside the scope of this invention and catalysts lacking at least one of the ingredients specified in this invention were prepared in accordance with the method described in Example 1. The proportions of the catalyst ingredients deposited in the finished catalysts were as follows:

Comparative Example 1
Fe:Ce:P:Pt:Pd:Rh = 0:0:0.05:0.5:0.2:0.05
Comparative Example 2
Fe:Ce:P:Pt:Pd:Rh = 0:0:0:0.5:0.2:0.05
Comparative Example 3
Fe:Ce:P:Pt:Pd:Rh = 5:5:1:0.5:0.2:0.05
Comparative Example 4
Fe:Ce:P:Pt:Pd:Rh = 0:0:0:1:0.4:0.1

EXAMPLE 18

The catalysts obtained in Examples 1 to 17 and Comparative Examples 1 to 4 were tested by an A/F perturbation method.

A 4-cylinder 1,800 cc fuel injection-type engine was used, and under normal operation with an actual standard load, the A/F ratio was varied forcedly between ±1.0 A/F at 1.0 Hz, and the conversions of NO, CO and HC were measured. The temperature of the inlet of the catalyst was set at 550° C., and the space velocity (SV) was 60,000 hr$^{-1}$.

After measuring the fresh activity of the catalyst, the rotating speed of the engine was raised, and the A/F was varied at 0.1 Hz for 100 hours. The activity of the catalyst after aging was tested under the same conditions as in the measurement of the fresh activity.

Tables 1 and 2 show the conversion efficiencies for NO, CO and HC versus the mean A/F (M. A/F) determined by the Eltinge method on the fresh catalysts and the catalysts aged for 100 hours. The conversion efficiency for NO was a gross conversion efficiency determined without consideration given to the proportion of $NH_3$ formed as a by-product. The A/F ratio was selected such that the window width could be fully determined in activity measurement.

As is clearly seen from the results obtained, the fresh catalysts obtained in Examples 1 to 17 have high conversion efficiencies for the exhaust gas components near the equivalent A/F ratio (=14.64), and a wide window width (the A/F width within which the three components can be removed in amounts of more than 80%, and which is expressed in an A/F unit). Furthermore, these catalysts have a very high CO–NO crossover point (the point at which the CO conversion efficiency curve and the NO conversion efficiency curve versus the mean A/F cross each other, that is the point at which the CO conversion efficiency is equal to the NO conversion efficiency).

After aging for 100 hours, the catalysts of this invention retain these high performances fully, and their window widths and CO–NO crossover points are at high levels.

On the other hand, the catalysts of Comparative Examples 1 to 4 have a low CO or NO conversion efficiency. Hence, their window widths are narrow, and their CO–NO crossover points are low. Furthermore, while these comparative catalysts show fairly high level of performance in the fresh state, these performances are reduced considerably after aging.

This fact will be clearly understood, for example, by comparing FIGS. 1 to 4 with FIGS. 5 to 8.

TABLE 1

| | (FRESH) | | | | | | | | | | | | | |
|---|---|---|---|---|---|---|---|---|---|---|---|---|---|---|
| | Catalyst composition (atomic weight ratio, g/l of catalyst) | | | | | | Gross NO conversion efficiency (%) (M. A/F) | | | | CO conversion efficiency (%) (M. A/F) | | | |
| Catalyst | Ce | Fe | P | Pt | Pd | Rh | 14.50 | 14.60 | 14.70 | 14.80 | 14.50 | 14.60 | 14.70 | 14.80 |
| Example | | | | | | | | | | | | | | |
| 1 | 5 | 5 | 0.05 | 0.5 | 0.2 | 0.05 | 99 | 99 | 94 | 62 | 83 | 93 | 99 | 99 |
| 2 | 5 | 5 | 0.05 | 0.5 | 0.2 | 0.05 | 99 | 99 | 94 | 60 | 83 | 93 | 99 | 99 |
| 3 | 5 | 5 | 0.05 | 0.5 | 0.2 | 0.05 | 98 | 99 | 92 | 59 | 81 | 91 | 98 | 99 |
| 4 | 5 | 5 | 0.05 | 0.5 | 0.2 | 0.05 | 98 | 99 | 93 | 60 | 80 | 91 | 98 | 99 |
| 5 | 5 | 5 | 0.05 | 0.5 | 0.2 | 0.05 | 99 | 99 | 94 | 61 | 82 | 93 | 98 | 99 |
| 6 | 5 | 5 | 0.05 | 0.5 | 0.2 | 0.05 | 99 | 99 | 94 | 60 | 82 | 93 | 99 | 99 |
| 7 | 5 | 5 | 0.05 | 0.5 | 0.2 | 0.05 | 99 | 99 | 93 | 60 | 81 | 93 | 98 | 99 |
| 8 | 2 | 2 | 0.05 | 0.5 | 0.2 | 0.05 | 98 | 98 | 92 | 58 | 81 | 92 | 98 | 99 |
| 9 | 10 | 10 | 0.05 | 0.5 | 0.2 | 0.05 | 99 | 99 | 95 | 62 | 82 | 93 | 99 | 99 |
| 10 | 5 | 5 | 0.02 | 0.5 | 0.2 | 0.05 | 98 | 99 | 89 | 54 | 84 | 94 | 99 | 99 |
| 11 | 5 | 5 | 0.3 | 0.5 | 0.2 | 0.05 | 99 | 99 | 95 | 63 | 79 | 92 | 98 | 98 |
| 12 | 5 | 5 | 0.05 | 0.5 | 0.2 | 0.1 | 98 | 99 | 92 | 59 | 80 | 91 | 97 | 98 |
| 13 | 5 | 5 | 0.05 | 1.5 | 0.6 | 0.05 | 98 | 99 | 93 | 60 | 82 | 93 | 99 | 99 |
| 14 | 5 | 5 | 0.05 | 0.5 | 0 | 0.05 | 99 | 99 | 95 | 62 | 82 | 93 | 99 | 99 |
| 15 | 5 | 5 | 0.05 | 0.5 | 0.2 | 0.05 | 99 | 99 | 93 | 60 | 82 | 93 | 99 | 99 |
| 16 | 5 | 5 | 0.05 | 0.5 | 0.2 | 0.05 | 99 | 99 | 94 | 61 | 81 | 93 | 98 | 99 |
| 17 | 5 | 0 | 0.05 | 0.5 | 0.2 | 0.1 | 98 | 99 | 91 | 52 | 84 | 95 | 99 | 99 |
| Comparative Example | | | | | | | | | | | | | | |
| 1 | 0 | 0 | 0.05 | 0.5 | 0.2 | 0.05 | 86 | 74 | 58 | — | 77 | 83 | 87 | — |

TABLE 1-continued

(FRESH)

| | | | | | | | | | | | | | | |
|---|---|---|---|---|---|---|---|---|---|---|---|---|---|---|
| 2 | 0 | 0 | 0 | 0.5 | 0.2 | 0.05 | 82 | 68 | 52 | — | 77 | 84 | 89 | — |
| 3 | 5 | 5 | 2 | 0.5 | 0.2 | 0.05 | 97 | 96 | 84 | 50 | 65 | 78 | 86 | 93 |
| 4 | 0 | 0 | 0 | 1 | 0.4 | 0.2 | 87 | 75 | 60 | — | 78 | 86 | 90 | — |

| Catalyst | HC conversion efficiency (%) (M. A/F) | | | | CO—NO crossover points (%) | Window width (A/F) |
|---|---|---|---|---|---|---|
| | 14.50 | 14.60 | 14.70 | 14.80 | | |
| Example | | | | | | |
| 1 | 97 | 98 | 99 | 99 | 98 | 0.28 |
| 2 | 97 | 98 | 99 | 99 | 98 | 0.27 |
| 3 | 96 | 97 | 98 | 99 | 97 | 0.26 |
| 4 | 95 | 96 | 97 | 98 | 97 | 0.24 |
| 5 | 96 | 97 | 98 | 99 | 97 | 0.25 |
| 6 | 96 | 98 | 99 | 99 | 98 | 0.27 |
| 7 | 97 | 98 | 99 | 99 | 97 | 0.25 |
| 8 | 95 | 96 | 97 | 98 | 96 | 0.24 |
| 9 | 96 | 97 | 98 | 99 | 98 | 0.28 |
| 10 | 97 | 98 | 99 | 99 | 98 | 0.27 |
| 11 | 94 | 97 | 98 | 98 | 97 | 0.26 |
| 12 | 95 | 96 | 97 | 98 | 96 | 0.24 |
| 13 | 97 | 98 | 99 | 99 | 98 | 0.27 |
| 14 | 97 | 98 | 99 | 99 | 98 | 0.26 |
| 15 | 97 | 98 | 99 | 99 | 97 | 0.25 |
| 16 | 96 | 97 | 98 | 98 | 97 | 0.24 |
| 17 | 98 | 99 | 99 | 99 | 97 | 0.26 |
| Comparative Example | | | | | | |
| 1 | 96 | 98 | 99 | — | 80 | 0.01 |
| 2 | 98 | 99 | 99 | — | 79 | NONE |
| 3 | 94 | 96 | 98 | 98 | 86 | 0.09 |
| 4 | 98 | 99 | 99 | — | 82 | 0.03 |

TABLE 2

(AFTER AGING, 100 hr.)

| Catalyst | Gross NO conversion efficiency (%) (M. A/F) | | | | CO conversion efficiency (%) (M. A/F) | | | | HC conversion efficiency (%) (M. A/F) | | | | CO—NO crossover points (%) | Window width (A/F) |
|---|---|---|---|---|---|---|---|---|---|---|---|---|---|---|
| | 14.50 | 14.60 | 14.70 | 14.80 | 14.50 | 14.60 | 14.70 | 14.80 | 14.50 | 14.60 | 14.70 | 14.80 | | |
| Example | | | | | | | | | | | | | | |
| 1 | 98 | 95 | 80 | 58 | 77 | 89 | 97 | 99 | 92 | 96 | 99 | 99 | 92 | 0.17 |
| 2 | 97 | 93 | 80 | 56 | 74 | 87 | 96 | 98 | 91 | 96 | 99 | 99 | 91 | 0.16 |
| 3 | 96 | 93 | 80 | 57 | 74 | 87 | 97 | 98 | 89 | 95 | 98 | 99 | 90 | 0.16 |
| 4 | 96 | 92 | 79 | 56 | 73 | 86 | 96 | 98 | 88 | 94 | 97 | 98 | 90 | 0.14 |
| 5 | 98 | 94 | 81 | 59 | 76 | 88 | 97 | 99 | 92 | 95 | 98 | 99 | 91 | 0.17 |
| 6 | 98 | 93 | 80 | 56 | 77 | 89 | 97 | 99 | 92 | 96 | 98 | 99 | 91 | 0.17 |
| 7 | 97 | 93 | 79 | 56 | 77 | 88 | 97 | 99 | 91 | 96 | 99 | 99 | 90 | 0.16 |
| 8 | 94 | 90 | 78 | 54 | 75 | 86 | 94 | 98 | 87 | 93 | 96 | 98 | 89 | 0.15 |
| 9 | 98 | 95 | 81 | 59 | 76 | 88 | 97 | 98 | 89 | 94 | 97 | 99 | 92 | 0.17 |
| 10 | 94 | 89 | 78 | 51 | 75 | 88 | 96 | 98 | 92 | 96 | 98 | 99 | 88 | 0.15 |
| 11 | 96 | 91 | 80 | 59 | 69 | 84 | 94 | 98 | 85 | 90 | 95 | 97 | 88 | 0.14 |
| 12 | 95 | 90 | 80 | 57 | 73 | 86 | 95 | 98 | 91 | 95 | 97 | 98 | 89 | 0.15 |
| 13 | 97 | 93 | 79 | 54 | 75 | 88 | 96 | 98 | 92 | 97 | 99 | 99 | 91 | 0.17 |
| 14 | 97 | 94 | 81 | 56 | 72 | 86 | 97 | 99 | 91 | 96 | 99 | 99 | 91 | 0.15 |
| 15 | 98 | 94 | 81 | 57 | 75 | 88 | 97 | 99 | 92 | 96 | 98 | 99 | 91 | 0.17 |
| 16 | 97 | 94 | 81 | 58 | 74 | 87 | 97 | 99 | 91 | 96 | 99 | 99 | 91 | 0.16 |
| 17 | 94 | 90 | 74 | 50 | 78 | 90 | 98 | 99 | 92 | 97 | 99 | 99 | 90 | 0.16 |
| Comparative Example | | | | | | | | | | | | | | |
| 1 | 72 | 62 | 51 | — | 67 | 75 | 80 | — | 92 | 96 | 98 | — | 69 | NONE |
| 2 | 66 | 57 | 47 | — | 62 | 70 | 76 | — | 94 | 97 | 99 | — | 64 | NONE |
| 3 | 97 | 93 | 75 | — | 57 | 68 | 80 | — | 85 | 88 | 92 | — | 77 | NONE |
| 4 | 69 | 60 | 49 | — | 64 | 73 | 80 | — | 95 | 98 | 99 | — | 67 | NONE |

EXAMPLE 19

Active alumina was coated by a known technique on a commercially available codierite monolithic refractory carrier (cell density 300 cells/in$^2$) in a cylindrical form having a diameter of 48 mm and a length of 76 mm.

The active alumina-coated monolithic refractory carrier obtained was dipped for 3 minutes at room temperature in a solution of 43 g of cerium nitrate and 40 g of ferric nitrate in 182 cc of distilled water. The excess of the solution was blown away by air, and the carrier was dried at 130° C. for 2 hours and then calcined at 550° C. for 3 hours. As a result, 0.85 g of cerium oxide and 0.40 g of iron oxide deposited on the carrier. The product was then dipped at room temperature for 1 hour in 140 cc of an aqueous solution containing 0.050 g of rhodium trichloride. It was then dried at 130° C., and calcined at 500° C. to deposit 0.014 g of rhodium. Finally, the product was dipped for 1 hour at room temperature in 140 cc of an aqueous solution containing 0.045 g of 85% phosphoric acid and 0.484 g of chloroplatinic acid, dried at 130° C., and reductively calcined at 300° C. for 2 hours under a gaseous mixture consisting of 10% of $H_2$ and 90% of $N_2$ to deposit 0.13 g of platinum and 0.011 g of P (as an element).

Thus, a finished catalyst was obtained which had deposited thereon 5 g of Ce, 2 g of Fe, 1.0 g of Pt, 0.1 g of Rh and 0.08 g of P (g-atoms) per liter of the catalyst.

EXAMPLES 20 TO 22

Finished catalysts having the following compositions were prepared in the same way as in Example 19.

| Example | Ce | Fe | P | Pt | Rh |
|---|---|---|---|---|---|
| 20 | 2 | 2 | 0.032 | 1.0 | 0.1 |
| 21 | 8 | 4 | 0.016 | 0.5 | 0.05 |
| 22 | 10 | — | 0.12 | 1.5 | 0.15 |

EXAMPLE 23

A finished catalyst of the following composition was prepared by operating in the same way as in Example 19 except that a part of the cerium nitrate was replaced by lanthanum nitrate.

Ce:Fe:La:P:Pt:Rh = 3:2:2:0.096:1.2:0.15

EXAMPLE 24

Cerium nitrate and ferric nitrate were dissolved in the alumina slurry which was used in the Example of U.S. Pat. No. 3,928,239 for alumina coating. Alumina, Ce and Fe were deposited simultaneously on a monolithic refractory carrier from the resulting slurry. The carrier was dried at 130° C. for 3 hours, and calcined at 550° C. for 2 hours. Then, Rh, P and Pt were deposited on the product in the same way as in Example 19 to afford a catalyst having the following composition.

Ce:Fe:P:Pt:Rh = 5:2:0.08:1.0:0.1

COMPARATIVE EXAMPLES 5 TO 7

Catalysts having the following compositions lacking at least one of the ingredients specified in this invention were prepared in the same way as in Example 19.

| Comparative Example | Ce | Fe | P | Pt | Rh |
|---|---|---|---|---|---|
| 5 | — | — | — | 1.0 | 0.1 |
| 6 | — | — | 0.08 | 1.0 | 0.1 |
| 7 | — | 2 | 0.08 | 1.0 | 0.1 |

EXAMPLE 25

The catalysts obtained in Examples 19 to 24 and Comparative Examples 5 to 7 were tested by the A/F perturbation method. The engine and the method of evaluation used were the same as those described in Example 18 except that the space velocity (SV) was changed to 80,000 $hr^{-1}$. The A/F was selected such that the window width could be determined in activity measurement.

The CO-NO crossover points and the window widths obtained by this test are shown in Table 3. The NO conversion efficiency was a gross conversion efficiency without consideration given to the proportion of by-product $NH_3$.

It is seen from Table 3 that the catalysts of this invention (Examples 19 to 24) have high CO-NO crossover points and broad window widths, but the comparative catalysts (except those obtained in Comparative Example 7) have low CO-NO crossover points and narrow window widths.

Figure 9:
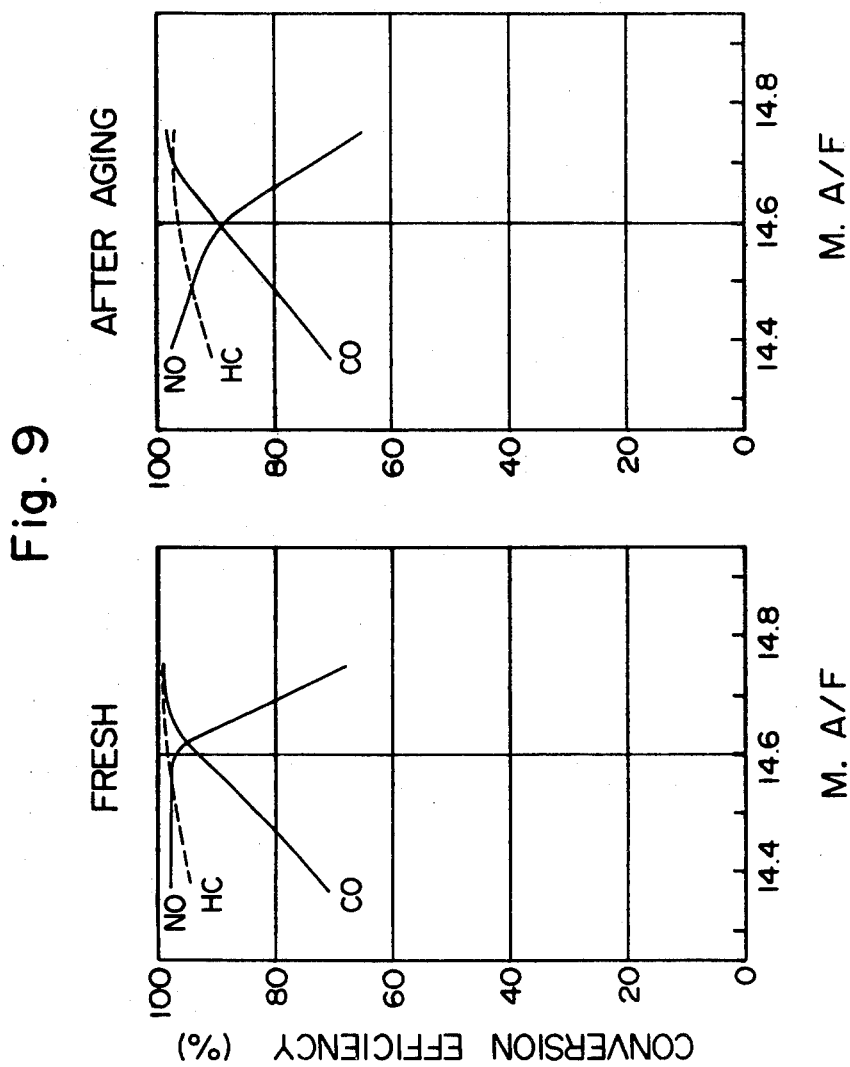
Figure 10:
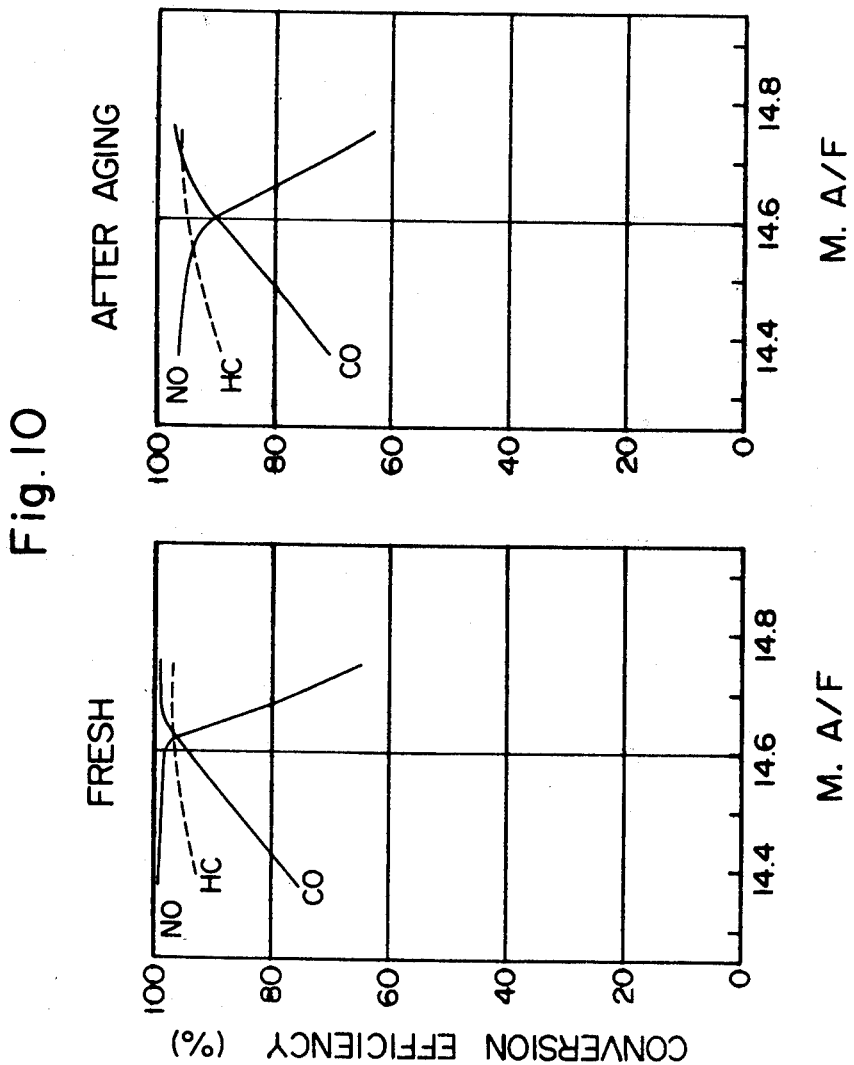
Figure 11:
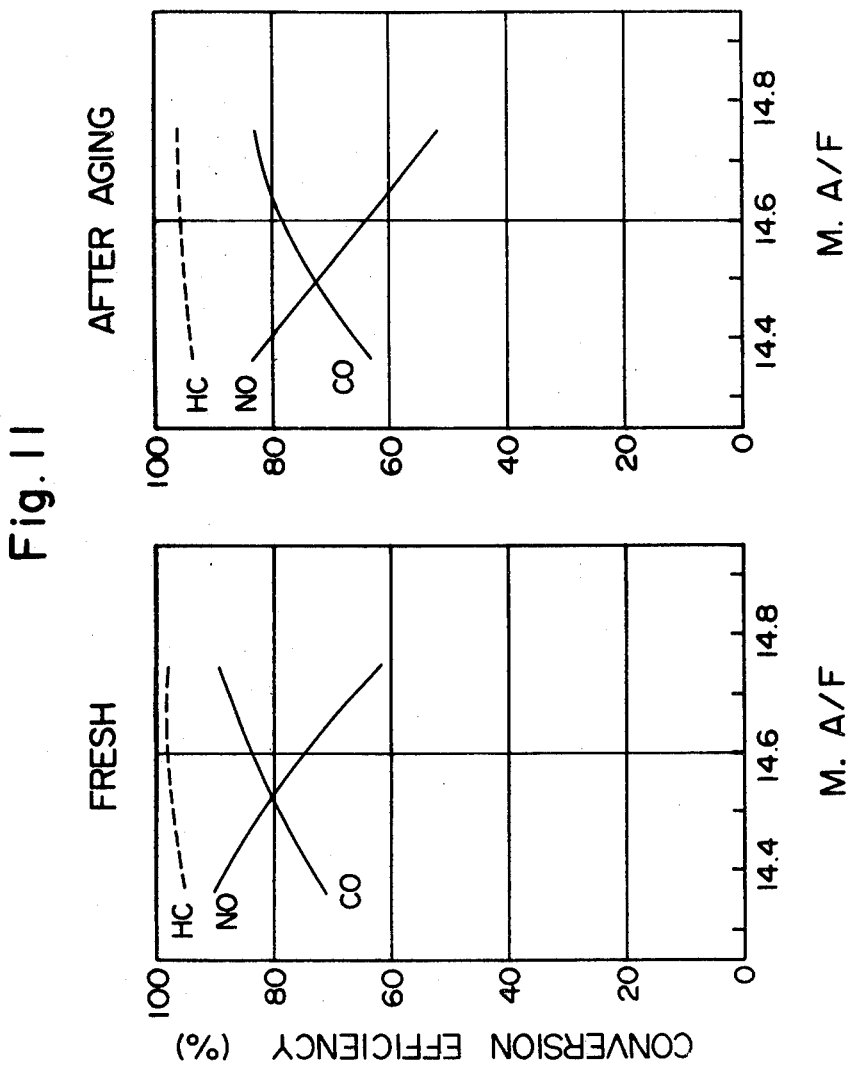
Figure 12:
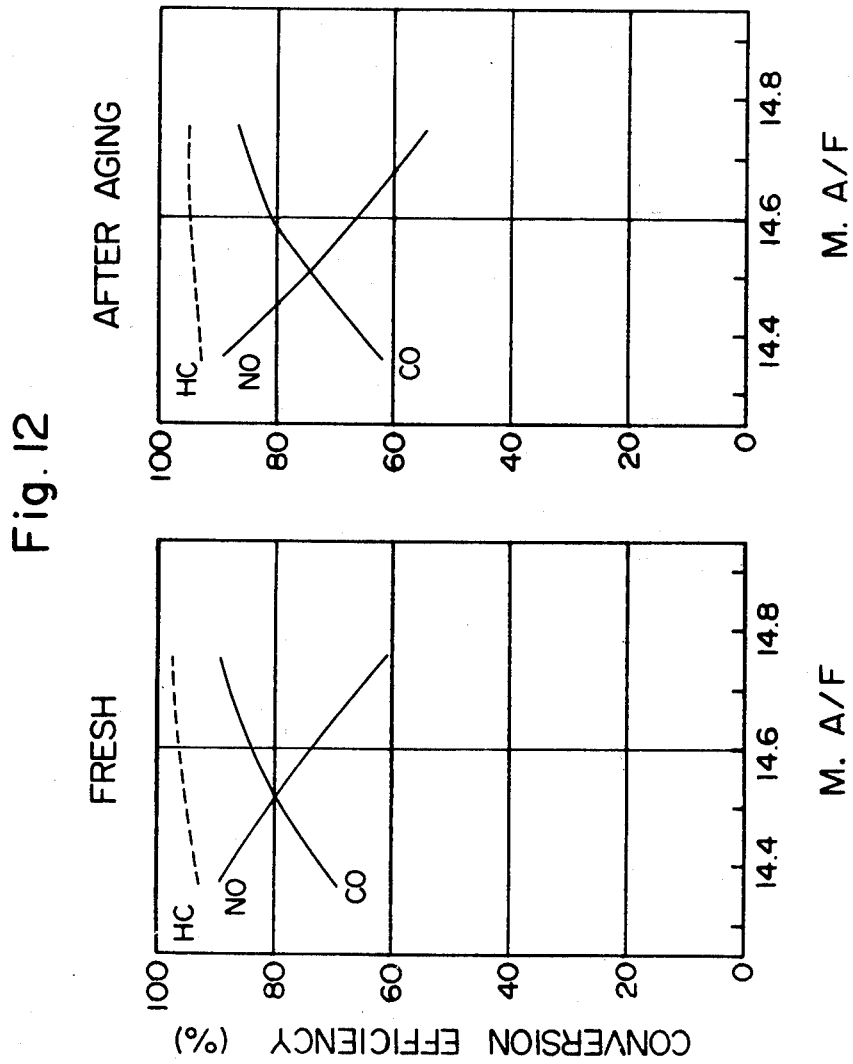
Figure 13:
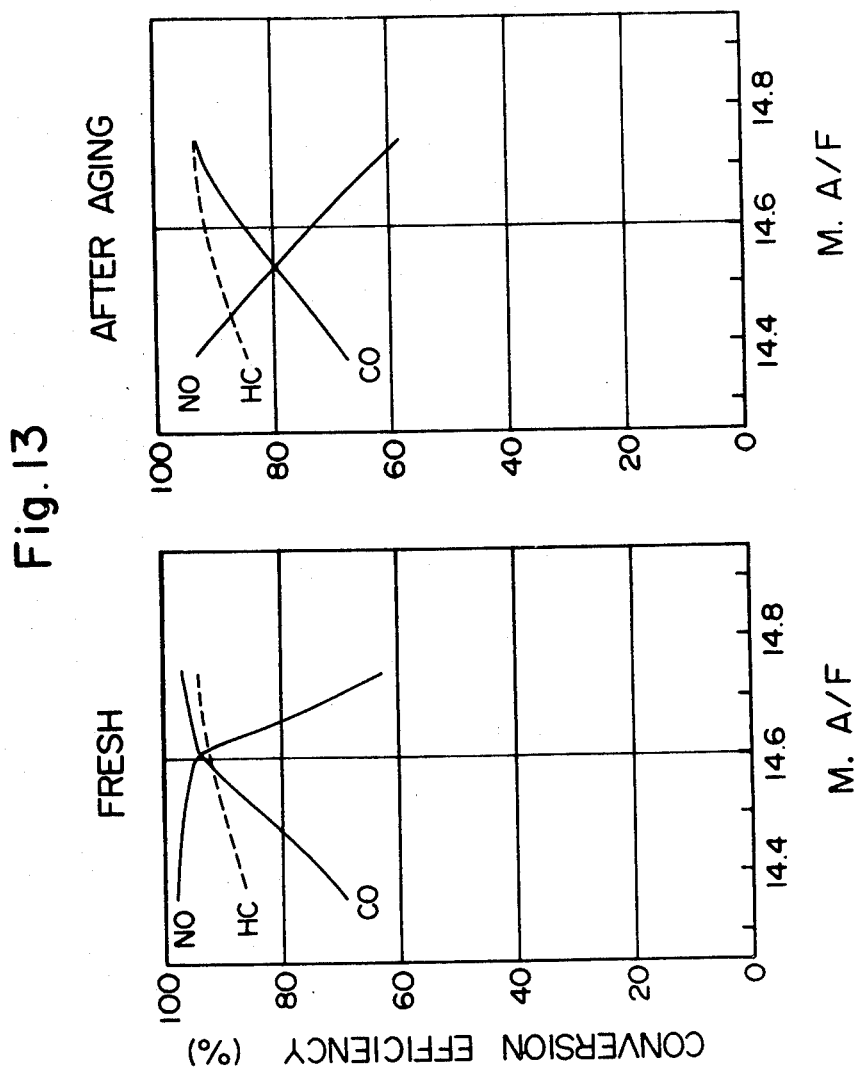

This fact will be clearly understood by comparing FIGS. 9 and 10 (Fresh) with FIGS. 11 to 13 (Fresh).

EXAMPLE 26

The catalyst obtained in Example 25 and tested for fresh activity was then aged in a testing device on an engine.

The catalyst was packed into a multi-converter, and tested for 100 hours at a temperature of 700° C. and a space velocity of 120,000 $hr^{-1}$ with a perturbation of A/F within ±1.0 at a frequency of 0.5 Hz. The used fuel had a maximum Pb content of 0.003 g Pb/gallon.

The results of the test are shown in Table 4.

It is seen from Table 4 that the catalysts of this invention still retain high levels of CO-NO crossover points and broad window widths, whereas the comparative catalysts have low CO-NO crossover points and had little or no window. This fact will be clearly understood by comparing FIGS. 9 and 10 (AFTER AGING) with FIGS. 11 to 13 (AFTER AGING).

TABLE 3

(FRESH)

| Catalyst | Catalyst composition (atomic weight ratio, g/l of catalyst) | | | | | | Gross NO conversion efficiency (%) (M. A/F) | | | | CO conversion efficiency (%) (M. A/F) | | | | HC conversion efficiency (%) (M. A/F) | | | | CO—NO crossover points | Window width |
|---|---|---|---|---|---|---|---|---|---|---|---|---|---|---|---|---|---|---|---|---|
| | Ce | Fe | La | P | Pt | Rh | 14.4 | 14.5 | 14.6 | 14.7 | 14.4 | 14.5 | 14.6 | 14.7 | 14.4 | 14.5 | 14.6 | 14.7 | (%) | (A F) |
| Example | | | | | | | | | | | | | | | | | | | | |
| 19 | 5 | 2 | — | 0.08 | 1.0 | 0.1 | 98 | 98 | 97 | 78 | 74 | 83 | 93 | 98 | 95 | 97 | 98 | 99 | 95 | 0.22 |
| 20 | 2 | 2 | — | 0.032 | 1.0 | 0.1 | 98 | 97 | 96 | 74 | 73 | 82 | 91 | 98 | 94 | 95 | 96 | 97 | 94 | 0.20 |
| 21 | 8 | 4 | — | 0.016 | 0.5 | 0.05 | 97 | 96 | 95 | 75 | 74 | 82 | 92 | 98 | 87 | 91 | 94 | 95 | 94 | 0.20 |
| 22 | 10 | — | — | 0.12 | 1.5 | 0.15 | 98 | 97 | 96 | 76 | 76 | 85 | 94 | 98 | 96 | 97 | 98 | 98 | 95 | 0.23 |
| 23 | 3 | 2 | 2 | 0.096 | 1.2 | 0.15 | 99 | 98 | 98 | 75 | 78 | 86 | 95 | 99 | 93 | 95 | 97 | 97 | 96 | 0.25 |
| 24 | 5 | 2 | — | 0.08 | 1.0 | 0.1 | 98 | 98 | 97 | 79 | 75 | 82 | 93 | 98 | 95 | 97 | 98 | 99 | 95 | 0.21 |
| Comparative Example | | | | | | | | | | | | | | | | | | | | |
| 5 | — | — | — | — | 1.0 | 0.1 | 88 | 82 | 74 | 66 | 74 | 79 | 84 | 88 | 96 | 97 | 98 | 98 | 80 | 0.01 |
| 6 | — | — | — | 0.08 | 1.0 | 0.1 | 87 | 81 | 74 | 65 | 72 | 79 | 84 | 88 | 93 | 95 | 96 | 97 | 80 | 0.01 |

TABLE 3-continued (FRESH)

| Catalyst | Catalyst composition (atomic weight ratio, g/l of catalyst) | | | | | | Gross NO conversion efficiency (%) (M. A/F) | | | | CO conversion efficiency (%) (M. A/F) | | | | HC conversion efficiency (%) (M. A/F) | | | | CO—NO crossover points (%) | Window width (A F) |
|---|---|---|---|---|---|---|---|---|---|---|---|---|---|---|---|---|---|---|---|---|
| | Ce | Fe | La | P | Pt | Rh | 14.4 | 14.5 | 14.6 | 14.7 | 14.4 | 14.5 | 14.6 | 14.7 | 14.4 | 14.5 | 14.6 | 14.7 | | |
| 7 | — | 2 | — | 0.08 | 1.0 | 0.1 | 98 | 97 | 95 | 71 | 73 | 82 | 93 | 96 | 87 | 90 | 98 | 94 | 94 | 0.19 |

TABLE 4

(AFTER AGING)

| Catalyst | Catalyst composition (atomic weight ratio, g l of catalyst) | | | | | | Gross NO conversion efficiency (%) (M. A/F) | | | | CO conversion efficiency (%) (M. A/F) | | | |
|---|---|---|---|---|---|---|---|---|---|---|---|---|---|---|
| | Ce | Fe | La | P | Pt | Rh | 14.4 | 14.5 | 14.6 | 14.7 | 14.4 | 14.5 | 14.6 | 14.7 |
| Example | | | | | | | | | | | | | | |
| 19 | 5 | 2 | — | 0.08 | 1.0 | 0.1 | 97 | 93 | 88 | 72 | 73 | 81 | 89 | 97 |
| 20 | 2 | 2 | — | 0.032 | 1.0 | 0.1 | 95 | 91 | 84 | 70 | 70 | 79 | 86 | 92 |
| 21 | 8 | 4 | — | 0.016 | 0.5 | 0.05 | 93 | 89 | 83 | 69 | 70 | 78 | 86 | 93 |
| 22 | 10 | — | — | 0.12 | 1.5 | 0.15 | 95 | 87 | 76 | 65 | 73 | 80 | 86 | 92 |
| 23 | 3 | 2 | 2 | 0.096 | 1.2 | 0.15 | 96 | 95 | 90 | 71 | 73 | 81 | 90 | 96 |
| 24 | 5 | 2 | — | 0.08 | 1.0 | 0.1 | 97 | 92 | 86 | 71 | 72 | 81 | 89 | 97 |
| Comparative Example | | | | | | | | | | | | | | |
| 5 | — | — | — | — | 1.0 | 0.1 | 80 | 72 | 63 | 56 | 66 | 73 | 78 | 82 |
| 6 | — | — | — | 0.08 | 1.0 | 0.1 | 85 | 75 | 66 | 58 | 65 | 74 | 81 | 85 |
| 7 | — | 2 | — | 0.08 | 1.0 | 0.1 | 92 | 83 | 74 | 63 | 70 | 77 | 85 | 91 |

| Catalyst | HC conversion efficiency (%) (M. A/F) | | | | CO-NO crossover points (%) | Window width (A/F) |
|---|---|---|---|---|---|---|
| | 14.4 | 14.5 | 14.6 | 14.7 | | |
| Example | | | | | | |
| 19 | 91 | 95 | 96 | 97 | 88 | 0.16 |
| 20 | 88 | 92 | 94 | 95 | 85 | 0.12 |
| 21 | 83 | 89 | 93 | 94 | 84 | 0.11 |
| 22 | 93 | 95 | 96 | 97 | 83 | 0.07 |
| 23 | 90 | 93 | 95 | 96 | 90 | 0.16 |
| 24 | 90 | 95 | 96 | 97 | 87 | 0.14 |
| Comparative Example | | | | | | |
| 5 | 94 | 95 | 95 | 96 | 62 | NONE |
| 6 | 93 | 94 | 95 | 95 | 74 | NONE |
| 7 | 86 | 89 | 92 | 93 | 80 | 0.01 |

EXAMPLES 27 TO 29

Catalysts having a low ratio of deposition of Pt and Pd and a varying amount of P deposited were prepared by the same method as in Example 2. In Example 27, $H_3PO_4$ was not used. The finished catalysts had the following compositions.

Example 27: Fe:Ce:P:Pt:Pd:Rh=5:5:0:0.15:0.06:0.10
Example 28: Fe:Ce:P:Pt:Pd:Rh=5:5:0.005:0.15:0.06:0.10
Example 29: Fe:Ce:P:Pt:Pd:Rh=5:5:0.05:0.15:0.06:0.10

EXAMPLE 30

The catalysts obtained in Examples 27 to 29 were evaluated by the same testing method as in Example 18 except the space velocity 120,000 hr$^{-1}$. The results are shown in Tables 5 and 6.

These catalysts were devised for use as front three-way catalyst in a Modified Dual System. They have somewhat poor ability to remove CO and HC, but this defect can be remedied by combining such a catalyst with a rear oxidation catalyst.

Since the catalyst of Example 28 had a very low concentration of P, it did not show much difference in performance from the catalyst of Example 27 which contained no P. It appears that the catalyst of Example 29 contained too much P. It was noted that within a range of small Pt/Rh ratios, its performance was liable to be degraded.

TABLE 5

(FRESH)

| Catalyst | Catalyst composition (atomic weight ratio, g/l of catalyst) | | | | | | Gross NO conversion efficiency (%) (M. A/F) | | | | CO conversion efficiency (%) (M. A/F) | | | |
|---|---|---|---|---|---|---|---|---|---|---|---|---|---|---|
| | Ce | Fe | P | Pt | Pd | Rh | 14.5 | 14.6 | 14.7 | 14.8 | 14.5 | 14.6 | 14.7 | 14.8 |
| Example | | | | | | | | | | | | | | |
| 27 | 5 | 5 | 0 | 0.15 | 0.06 | 0.10 | 99 | 99 | 95 | 61 | 80 | 90 | 95 | 98 |
| 28 | 5 | 5 | 0.005 | 0.15 | 0.06 | 0.10 | 99 | 99 | 95 | 62 | 80 | 91 | 96 | 98 |
| 29 | 5 | 5 | 0.05 | 0.15 | 0.06 | 0.10 | 98 | 97 | 92 | 58 | 78 | 88 | 93 | 96 |

| | HC conversion efficiency (%) | CO-NO crossover | Window |

TABLE 5-continued

| | (FRESH) | | | | | |
|---|---|---|---|---|---|---|
| | | (M. A/F) | | | points | width |
| Catalyst | 14.5 | 14.6 | 14.7 | 14.8 | (%) | (A/F) |
| Example | | | | | | |
| 27 | 82 | 86 | 89 | 90 | 95 | 0.25 |
| 28 | 82 | 86 | 89 | 91 | 96 | 0.25 |
| 29 | 80 | 84 | 87 | 88 | 93 | 0.22 |

TABLE 6

(AFTER AGING)

| | Catalyst composition (Atomic weight ratio, g/l of catalyst) | | | | | | Gross NO conversion efficiency (%) (M. A/F) | | | | CO conversion efficiency (%) (M. A/F) | | | |
|---|---|---|---|---|---|---|---|---|---|---|---|---|---|---|
| Catalyst | Ce | Fe | P | Pt | Pd | Rh | 14.5 | 14.6 | 14.7 | 14.8 | 14.5 | 14.6 | 14.7 | 14.8 |
| Example | | | | | | | | | | | | | | |
| 27 | 5 | 5 | 0 | 0.15 | 0.06 | 0.10 | 98 | 94 | 82 | 57 | 74 | 86 | 91 | 95 |
| 28 | 5 | 5 | 0.005 | 0.15 | 0.06 | 0.10 | 98 | 94 | 83 | 58 | 75 | 86 | 91 | 95 |
| 29 | 5 | 5 | 0.05 | 0.15 | 0.06 | 0.10 | 94 | 89 | 77 | 57 | 72 | 82 | 87 | 90 |

| | HC conversion efficiency (%) (M. A/F) | | | | CO-NO crossover points | Window width |
|---|---|---|---|---|---|---|
| Catalyst | 14.5 | 14.6 | 14.7 | 14.8 | (%) | (A/F) |
| Example | | | | | | |
| 27 | 77 | 80 | 84 | 86 | 89 | 0.11 |
| 28 | 78 | 81 | 84 | 86 | 89 | 0.14 |
| 29 | 75 | 78 | 81 | 83 | 84 | 0.01 |

What is claimed is:

1. A process for producing an auto exhaust gas catalyst capable of simultaneously removing hydrocarbons, carbon monoxide and nitrogen oxides, said catalyst consisting essentially of cerium, rhodium and platinum, and optionally, at least one additional element selected from the group consisting of iron, lanthanum, palladium and phosphorus, said process comprising first, simultaneously, depositing on a refractory inorganic support 0.5 to 30 g of cerium, 0 to 20 g of iron and 0 to 10 g of lanthanum, as elements, per liter of the finished catalyst, and thereafter depositing thereon, in any desired sequence, 0.005 to 0.3 g of rhodium, 0.05 to 3.0 g of platinum, 0 to 1.2 g of palladium and 0 to 0.5 g of phosphorus as elements, per liter of the finished catalyst, thereby causing rhodium to be present mainly on the surface layer of the catalyst.

2. The process of claim 1 wherein rhodium is the last of the elements to be deposited on said refractory inorganic support.

3. The process of claim 1 wherein an auto exhaust gas catalyst is prepared which comprises a porous carrier composed mainly of alumina and deposited thereon 1 to 15 g of cerium, 0 to 15 g of iron, 0 to 10 g of lanthanum, 0.01 to 0.2 g of rhodium, 0.1 to 2.0 g of platinum, 0 to 0.8 g of palladium and 0 to 0.5 g of phosphorus as elements per liter of the finished catalyst.

4. The process of claim 1 wherein an auto exhaust gas catalyst is prepared which comprises a monolithic refractory support having an active alumina coating and deposited thereon 0.5 to 30 g of cerium, 0 to 20 g of iron, 0 to 10 g of lanthanum, 0.02 to 0.3 g of rhodium, 0.2 to 3.0 g of platinum, 0 to 0.8 g of palladium and 0.01 to 0.5 g of phosphorus as elements per liter of the finished catalyst.

5. The process of claim 1 wherein a polyoxyethylene-type nonionic surface active agent having an average molecular weight of at least 500 is used in depositing the individual ingredients on the support.

6. The process of claim 1 wherein the auto exhaust gas catalyst is prepared by firstly depositing on a refractory inorganic carrier, 0.5 to 30 g of cerium, 0 to 20 g of iron and 0 to 10 g of lanthanum, secondly depositing 0.005 to 0.3 g of rhodium, and thirdly depositing 0.05 to 3.0 g of platinum, 0 to 1.2 g of palladium and 0 to 0.5 g of phosphorus, the amounts of said catalyst ingredients being calculated as elements per liter of the finished catalyst.

7. The process of claim 2 wherein a dinitrodiammine complex compound is used as a source of a platinum.

8. The process of claim 6 wherein the ratio of platinum to rhodium (Pt/Rh) is between about 3 and about 1 and the amount of phosphorus is zero.

9. An auto exhaust gas catalyst which is prepared by the process of claim 1.

10. The process of claim 1 in which iron, palladium and phosphorus are all present.

11. The process of claim 1 wherein at least one of the additional elements is present.

12. An auto exhaust gas catalyst which is prepared by the process of claim 2.

13. An auto exhaust gas catalyst which is prepared by the process of claim 3.

14. An auto exhaust gas catalyst which is prepared by the process of claim 10.

15. The process of claim 1 which comprises depositing cerium and, optionally, iron and lanthanum from an aqueous solution on the refractory inorganic support, drying the support containing cerium and, optionally, iron and lanthanum at 80° to 150° C. for 1 to 10 hours, converting the cerium and, optionally, iron and lanthanum elements to the respective oxides by calcining in air at 300° to 1100° C. for 1 to 10 hours; thereafter depositing rhodium on the carrier from an aqueous solution containing rhodium, drying at 80° to 200° C. for 1 to 5 hours, subjecting the carrier having rhodium deposited thereon to a first activation treatment; and thereafter depositing platinum and, optionally, at least one of palladium and phosphorus on the carrier from aqueous solutions containing platinum and, optionally, palladium and phosphorus, drying the carrier and deposited elements, and thereafter subjecting the carrier supported elements to a second activation treatment to form the auto exhaust gas catalyst.

16. The process of claim 15 wherein the first activation treatment comprises oxidative calcination in air at 150° to 600° C. for 1 to 10 hours and the second activation treatment comprises reductive calcination in a hydrogen atmosphere at 150° to 600° C. for 1 to 10 hours.

17. The method of claim 16 wherein iron, palladium and phosphorus are all deposited on the carrier.

18. The process of claim 9 in which cerium, platinum and, optionally, iron, lanthanum, palladium and phosphorus are initially, simultaneously, deposited on the refractory inorganic carrier from aqueous solutions containing said elements, the carrier-supported elements are dried at a temperature of 80° to 200° C. for 1 to 5 hours and then oxidatively calcined in air at 150° to 600° C. for 1 to 10 hours; and thereafter rhodium is deposited on the carrier from an aqueous solution containing rhodium followed by drying at 80° to 200° C. for 1 to 5 hours and then by reductive calcination in a hydrogen atmosphere at 150° to 600° C. for 1 to 10 hours.

19. The process of claim 18 wherein cerium, iron, platinum, palladium and phosphorus are all initially deposited on the refractory inorganic carrier.

* * * * *